(12) United States Patent
Irgang et al.

(10) Patent No.: US 10,875,449 B2
(45) Date of Patent: Dec. 29, 2020

(54) SUBSURFACE ENGRAVED VEHICLE LIGHT GUIDE

(71) Applicant: Rebo Lighting & Electronics, LLC, Ann Arbor, MI (US)

(72) Inventors: Todd D. Irgang, Saline, MI (US); Orin C. Lenz, Canton, MI (US)

(73) Assignee: REBO LIGHTING & ELECTRONICS, LLC, Ann Arbor, MI (US)

( * ) Notice: Subject to any disclaimer, the term of this patent is extended or adjusted under 35 U.S.C. 154(b) by 0 days.

(21) Appl. No.: 16/788,449

(22) Filed: Feb. 12, 2020

(65) Prior Publication Data
US 2020/0262342 A1 Aug. 20, 2020

Related U.S. Application Data

(60) Provisional application No. 62/807,497, filed on Feb. 19, 2019.

(51) Int. Cl.
*B60Q 3/62* (2017.01)
*B60Q 3/10* (2017.01)
*B44C 1/22* (2006.01)
*B60Q 3/78* (2017.01)
*B60Q 3/217* (2017.01)

(52) U.S. Cl.
CPC .............. *B60Q 3/62* (2017.02); *B44C 1/228* (2013.01); *B60Q 3/10* (2017.02); *B60Q 3/217* (2017.02); *B60Q 3/78* (2017.02)

(58) Field of Classification Search
CPC . B60Q 3/62; B60Q 3/78; B60Q 3/217; B60Q 3/10; B44C 1/228
See application file for complete search history.

(56) References Cited

U.S. PATENT DOCUMENTS

| | | | |
|---|---|---|---|
| 6,066,830 A | 5/2000 | Cline et al. | |
| 6,483,976 B2 | 11/2002 | Shie et al. | |
| 6,992,804 B2 | 1/2006 | Lamy et al. | |
| 7,704,586 B2 | 4/2010 | Schubel et al. | |

(Continued)

FOREIGN PATENT DOCUMENTS

| | | |
|---|---|---|
| CN | 1076625238 A | 2/2018 |
| DE | 102011016440 A1 | 10/2012 |

(Continued)

*Primary Examiner* — Donald L Raleigh
(74) *Attorney, Agent, or Firm* — Reising Ethington, P.C.

(57) ABSTRACT

An automotive light guide that displays subsurface engraved indicia to create an optical branding feature or another illuminated design element. In one implementation, the light guide has a body with a primary viewing outer side and a plurality of microablation sites located within the body. From a first viewing angle with respect to the primary viewing outer side, the plurality of microablation sites are configured to appear in a first indicia pattern, and from a second viewing angle, the plurality of microablation sites are configured to appear in a second indicia pattern. In another implementation, the light guide has a body with a planar engraving outer side and a rounded primary viewing outer side. The plurality of microablation sites are etched through the planar engraving side and are viewable as an indicia pattern through the rounded primary viewing outer side.

19 Claims, 4 Drawing Sheets

(56) References Cited

U.S. PATENT DOCUMENTS

| | | | |
|---|---|---|---|
| 8,449,161 B2 | 5/2013 | Igoe et al. | |
| 8,834,004 B2 | 9/2014 | Thompson et al. | |
| 10,687,049 B2* | 6/2020 | Sohn | H04N 13/139 |
| 2008/0025687 A1* | 1/2008 | Lee | G02B 6/0036 |
| | | | 385/146 |
| 2018/0160107 A1* | 6/2018 | Sohn | G02B 6/005 |
| 2019/0196082 A1* | 6/2019 | Jeong | G02B 6/002 |

FOREIGN PATENT DOCUMENTS

| | | | | |
|---|---|---|---|---|
| JP | H10232638 A | | 9/1998 | |
| JP | 2002318557 A | * | 10/2002 | ............ G09F 13/18 |
| JP | 2002318557 A | | 10/2002 | |
| KR | 20100035440 A | | 4/2010 | |
| WO | WO2004068451 A1 | | 8/2004 | |

\* cited by examiner

SUBSURFACE ENGRAVED VEHICLE LIGHT GUIDE

CROSS-REFERENCE TO RELATED APPLICATION

This application claims priority to US Provisional Application Ser. No. 62/807,497 filed Feb. 19, 2019, the entire contents of which is incorporated herein by reference in its entirety.

TECHNICAL FIELD

This invention generally relates to light guides, and more particularly, to automotive light guides that display subsurface engraved indicia.

BACKGROUND

Optical branding features and other illuminated design elements can enhance the aesthetics of a vehicle. To create such features and design elements, laser engraving may be used. However, with the laser engraving process, it may be desirable to create a more robust appearance while streamlining the manufacturing process. Further, various laser engraving techniques may be used to create a multifaceted light guide design that is advantageously used in different exterior and interior automotive applications.

SUMMARY

According to one embodiment, there is provided a light guide for a vehicle, comprising: a body having a primary viewing outer side; and a plurality of microablation sites located within the body. From a first viewing angle with respect to the primary viewing outer side, the plurality of microablation sites are configured to appear in a first indicia pattern, and from a second viewing angle with respect to the primary viewing outer side, the plurality of microablation sites are configured to appear in a second indicia pattern.

According to another embodiment, there is provided a light guide for a vehicle, comprising: a body having a planar engraving outer side and a rounded primary viewing outer side; and a plurality of microablation sites etched through the planar engraving side and viewable as an indicia pattern through the rounded primary viewing outer side.

According to another embodiment, there is provided a method of manufacturing a light guide for a vehicle, the light guide comprising: a body having a planar engraving outer side and a primary viewing outer side. The method comprises the steps of: engraving a plurality of microablation sites through the planar engraving outer side of the body; and dispersing the plurality of microablation sites such that, from a first viewing angle with respect to the primary viewing outer side, the plurality of microablation sites are configured to appear in a first indicia pattern. From a second viewing angle with respect to the primary viewing outer side, the plurality of microablation sites are configured to appear in a second indicia pattern.

DRAWINGS

Preferred exemplary embodiments will hereinafter be described in conjunction with the appended drawings, wherein like designations denote like elements, and wherein.

DESCRIPTION

The light guides and manufacturing methods disclosed herein include a subsurface laser engraved indicia pattern that is particularly desirable for various automotive interior and exterior applications. The laser engraving creates a plurality of microablation sites that scatter light and create a glow that is not generally visible in the material. Particular engraving methods and light guide structures, as described herein, can be used to create specific indicia display patterns that provide more visual interest than other standard laser formed light guides used in automotive applications.

Figure 1:
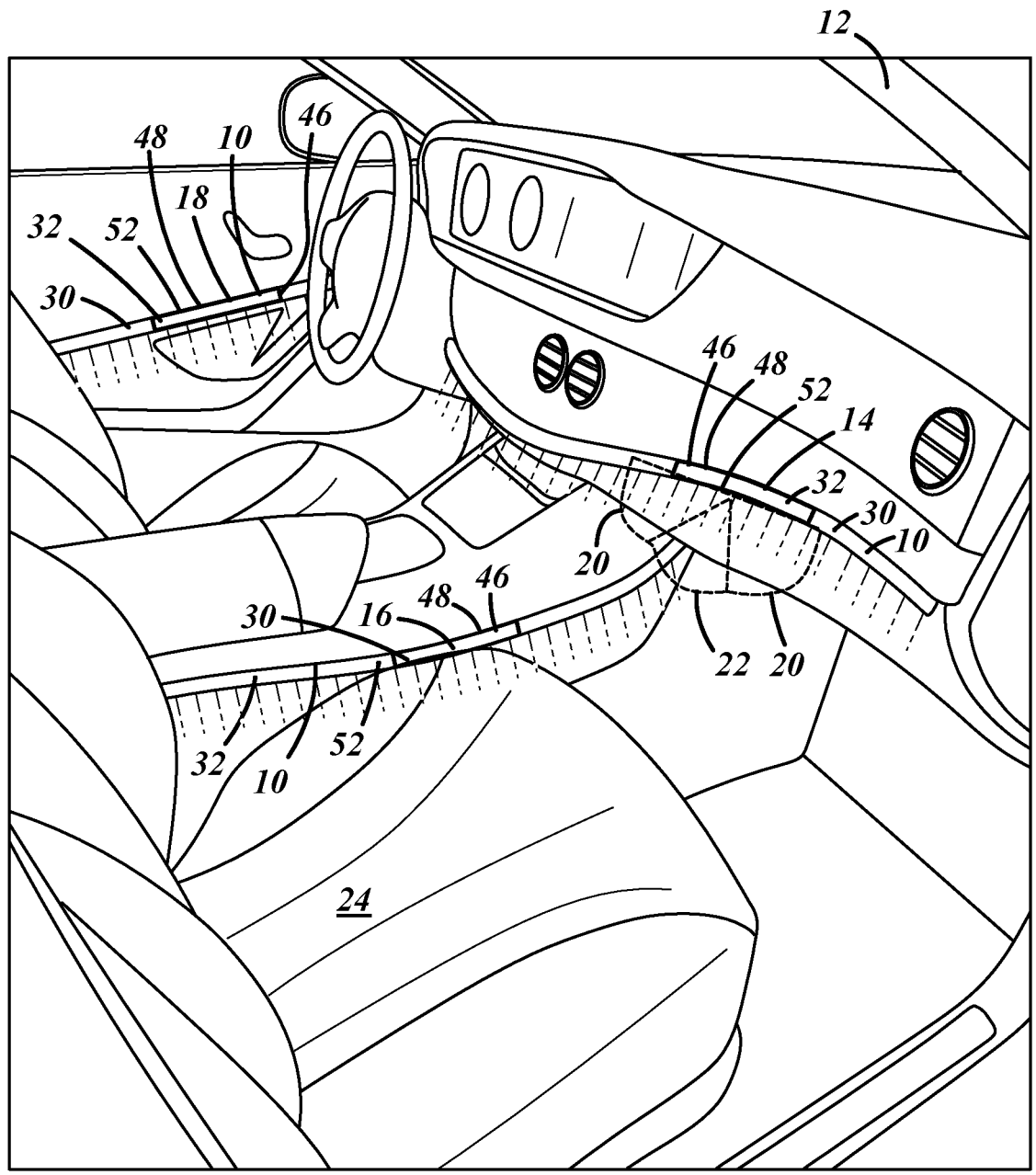
FIG. 1 shows various light guides in a vehicle with a schematic representation of where indicia could be displayed.

FIG. 1 schematically illustrates various applications of a light guide 10 for a vehicle 12, although other vehicle-based or non-vehicle-based applications for the light guide are certainly possible. FIG. 1 shows various embodiments of the light guide 10 used as a dash panel light 14, a center console light 16, and a door panel light 18. Other interior lighting applications are possible. Moreover, the light guide 10 can also be used in various exterior applications for the vehicle 12, such as with step rail lights, fog lights, or other exterior lighting applications. In an advantageous embodiment, the light guides 10 are used in vehicle locations that will be perceived by a user or onlooker of the vehicle 12 from various directions. For example, the dash panel light 14 is viewable from a first viewing angle range 20 as a user enters the vehicle 12 from either the driver's side or passenger's side, and is then viewable from a second viewing angle range 22 that is more straight-on as a user sits in the seat 24. The various viewing angle ranges will vary depending on how and where the light guide 10 is installed on the vehicle 12, as the first and second viewing angle ranges 20, 22 described herein are only examples. Additionally, the viewing angle ranges 20, 22 will vary depending on the configuration of the engraved indicia patterns that are detailed further below.

Figure 2:
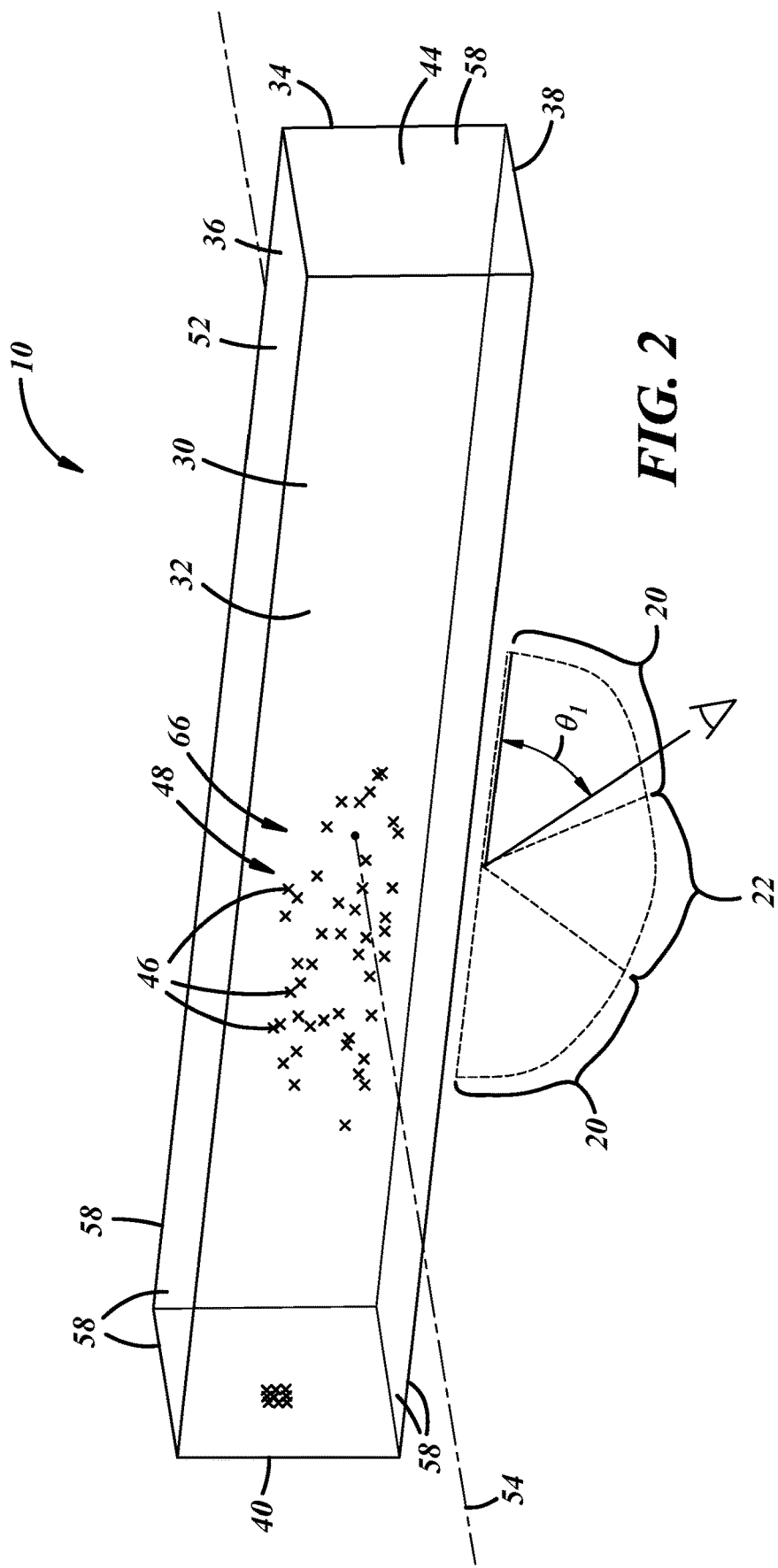
FIG. 2 illustrates a light guide in accordance with one embodiment.
Figure 3:
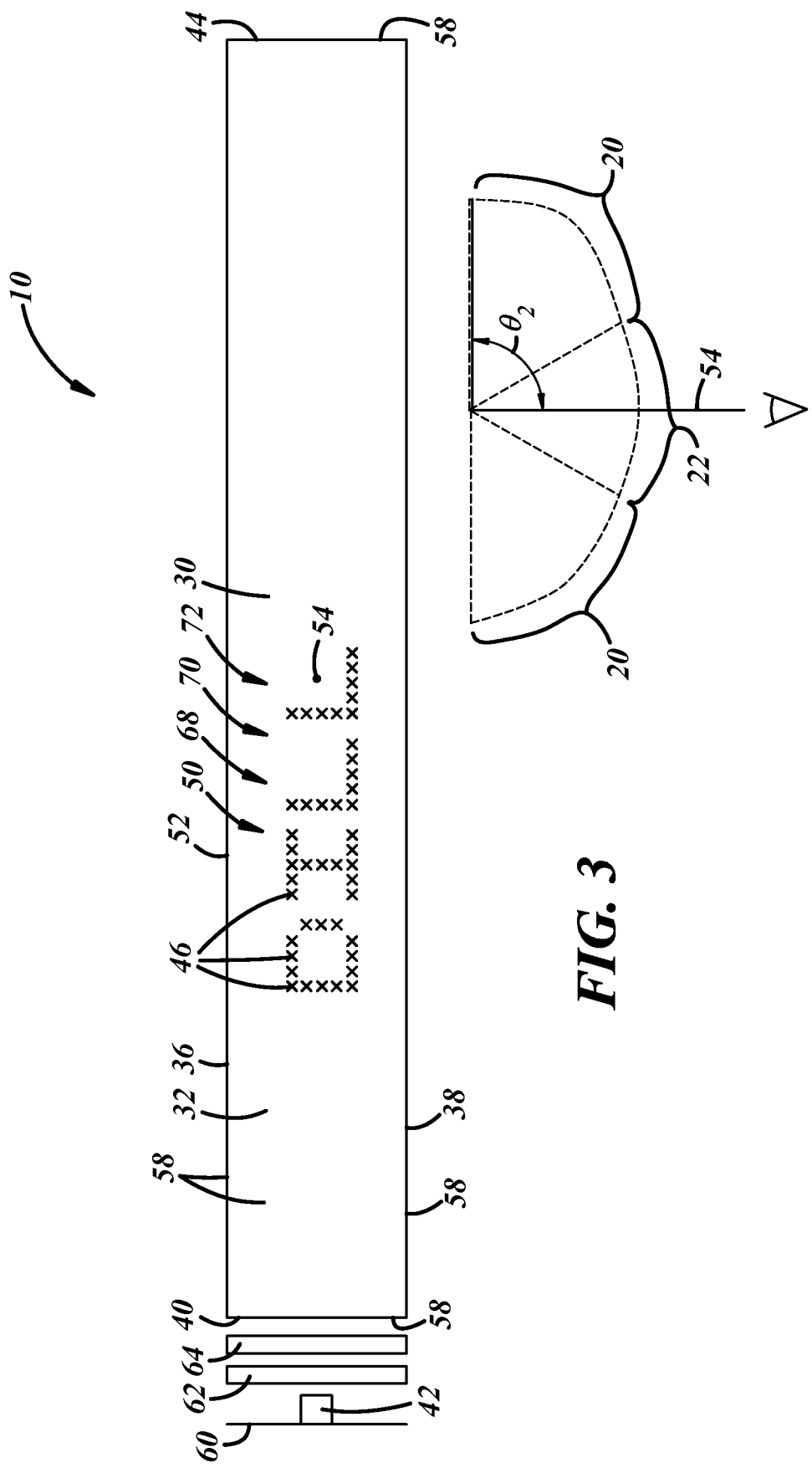
FIG. 3 shows the light guide of FIG. 2 from a different viewing angle.

FIGS. 2 and 3 schematically show an embodiment of a light guide 10 taken at two different perspectives. FIG. 2 shows the light guide from a first viewing angle $\theta_1$ which falls within the first viewing angle range 20 (a more peripheral vantage point), and FIG. 3 shows a second viewing angle $\theta_2$ which falls within the second viewing angle range 22 (a more direct vantage point). Again, the first viewing angle $\theta_1$, the second viewing angle $\eta_2$, the first viewing angle range 20, and/or the second viewing angle range 22 will likely vary from what is schematically illustrated and will depend on a number of factors such as the shape, configuration, positioning, etc. of the light guide 10, as well as how the user or onlooker may be positioned with respect to light guide 10 (e.g., a passenger in the backseat of the vehicle 12 will likely be able to perceive the dash panel light 14 but not the center console light 16, thereby limiting the perceivable viewing angle ranges 20, 22 for the center console light 16 in this particular example). The viewing angle ranges 20, 22 may also vary depending on how the overall light guide 10 is shaped, as embodiments that include curves or other optically impacting features will have viewing angle ranges 20, 22 that change at different points along the light guide 10. In the illustrated example, there is an approximate 45° difference between the first viewing angle $\theta_1$ shown in FIG. 2 and the second viewing angle $\theta_2$ shown in FIG. 3. In general, the first viewing angle range 20 represents a more peripheral vantage point, whereas the second viewing angle range 22 represents a more direct vantage point. It is possible for the first and/or second viewing angle range 20, 22 to include a single angular range (e.g., range 22) or multiple angular ranges (e.g., ranges 20).

The light guide 10 includes a body 30, which, in this embodiment, has four outer sides 32, 34, 36, 38; a proximal end 40 adjacent a light source 42; and a distal end 44 remote from the light source 42. The light guide 10 includes a plurality of microablation sites 46 located within the body 30, only a few being labeled in the drawings for clarity purposes. From the first viewing angle $\theta_1$ shown in FIG. 2, which is within the first viewing angle range 20 the plurality of microablation sites 46 are configured to appear in a first indicia pattern 48. From the second viewing angle $\theta_2$ shown in FIG. 3, which is within the second viewing angle range 22, the plurality of microablation sites 46 are configured to appear in a second indicia pattern 50. As will be detailed below, the microablation sites 46 can be particularly dispersed within the body 30 to provide the multifaceted visual variety between the first indicia pattern 48 and the second indicia pattern 50.

The body 30 of the light guide 10 is advantageously a solid structure and may take a variety of shapes depending on the desired implementation. In the illustrated embodiment, the body 30 is elongated such that the distance between the proximal and distal ends 40, 44 is magnitudes longer than the distance between opposing sides 32, 34 and 36, 38. This pipe-like, parallelepiped, cuboid, or elongated configuration may be more desirable for implementations such as the dash panel light 14, the center console light 16, and/or the door panel light 18 which are illustrated in FIG. 1; however, other shapes and configurations are certainly possible. In an advantageous embodiment, the body 30 is clear or slightly diffuse solid plastic. Other materials besides plastic are possible, such as a crystalline material or glass. In one particular embodiment, the body 30 is extruded or molded acrylic. The acrylic or another material may be doped with nanoparticles or other dopants that act as heat concentrators to promote the formation of the microablation sites 46 during the engraving process. Doping plastic with heat concentrating nanoparticles can help provide a finer resolution design for the first indicia pattern 48 and/or the second indicia pattern 50.

The body 30 includes, in this embodiment, four outer sides 32, 34, 36, 38. It is certainly possible to have more or fewer outer sides than what is illustrated. The illustrated embodiments include a primary viewing outer side 32, an opposite or planar engraving outer side 34, and first and second opposing sides 36, 38. The outer sides 32, 34, 36, 38 together, along with the proximal and distal ends 40, 44, generally define an outer perimeter 52 of the body 30. One or more of the outer sides 32, 34, 36, 38, 40, 44 may be wholly or partially implemented with various optical features, including but not limited to reflective surfaces, scattering flanges, optical texturing, etc.

The primary viewing outer side 32 is typically the side that is most prominently displayed to a user or onlooker of the vehicle 12. Accordingly, the first and second viewing angles $\theta_1$, $\theta_2$, as well as the first and second viewing angle ranges 20, 22, may be taken or generally defined with respect to a line 54 normal to the primary viewing outer side 32. In the embodiments shown in FIG. 1, the primary viewing outer side 32 is situated toward or faces the interior cabin of the vehicle 12. In exterior vehicle applications, the primary viewing outer side 32 may be situated so that it is more likely to be observed by a user or onlooker who is outside with respect to the vehicle 12.

Figure 4:
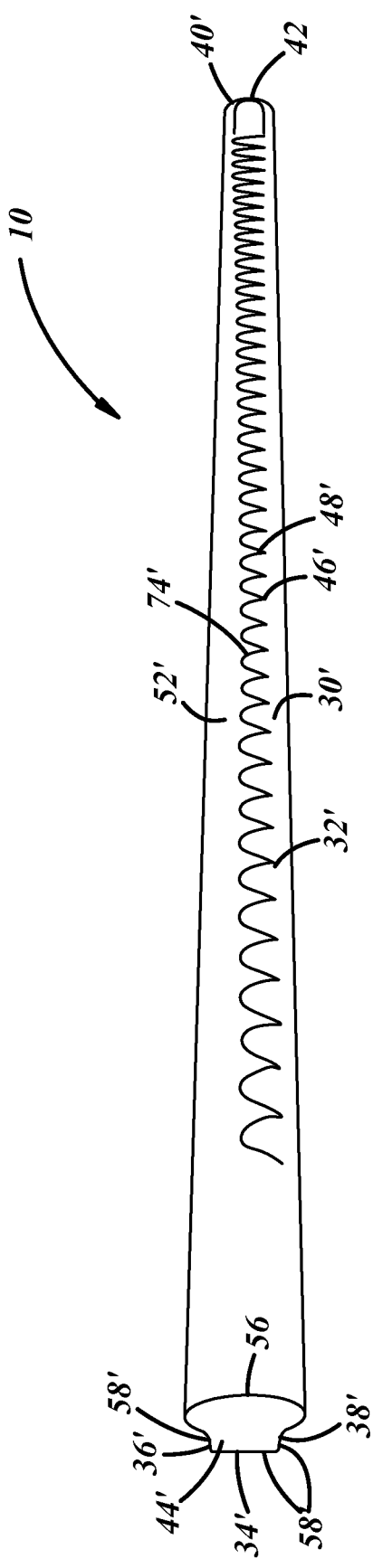
FIG. 4 is a light guide in accordance with another embodiment.

In the light guide 10 illustrated in FIG. 4, the primary viewing side 32' has a rounded convex contour 56. The convex contour 56 creates a rounded outer surface for the primary viewing side 32' and results in a mushroom-shaped body 30' and outer perimeter 52'. The primary viewing side 32' accordingly has a partial ellipse shape that meets the first and second opposing sides 36', 38'. The convex contour 56 of the primary viewing side 32' can advantageously expand the viewing area and can magnify the embedded indicia patterns 48', 50'. Additionally, the convex contour 56 of the primary viewing side 32' may also be more aesthetically adaptable for pipe-like arrangements in rounded portions of the cabin of the interior, such as the dash panel light 14 shown in FIG. 1.

The illustrated embodiments of FIGS. 2-4 also include a planar engraving outer side 34, 34' having a planar outer surface 58, 58' which in this implementation, is on the opposite side of the outer perimeter 52, 52' from the primary viewing outer side 32, 32', respectively. Also, in some embodiments, such as those illustrated, the opposing sides 36, 36', 38, 38' and ends 40, 40', 44, 44' also include planar outer surfaces 58, 58' and may also be considered a planar engraving outer side. Additionally, in the embodiment of FIGS. 2 and 3, the primary viewing outer side 32 includes a planar outer surface 58, and may also be considered a planar engraving outer side for purposes of manufacture. Planar outer surfaces include at least a planar portion (e.g., not convex or concave), and the planar portion does not include optical features such as scattering flanges or the like. Laser engraving through a planar outer surface 58 can be particularly advantageous, as it can result in a more precisely formed plurality of microablation sites 46, and accordingly, a sharper and/or more dimensionally accurate indicia pattern 48, 50. While it is preferable to manufacture the indicia patterns 48, 50 through planar outer surfaces 58, by directing the laser beam during manufacture so it strikes one of the planar outer surfaces 58 first, it may also be feasible to engrave through an alternately shaped outer surface, such as the convex contour 56 illustrated in FIG. 4 or some other shaped outer surface.

Light source 42 illuminates the light guide 10 and the indicia patterns 48, 50. The light source may be any operable type of light source, and in some embodiments, is a light emitting diode (LED). The LED may be a standard surface mount LED, an organic LED or OLED, a red-green-blue LED or RGB LED, or some other type of light source. The light source 42 can be mounted to a PCB 60 and ultimately connected to, and controlled by, a body control module or other electronic controller of the vehicle 12. In some embodiments, there is more than one light source 42, for example, one located at either end 40, 44, or one or more located along one of the other sides 32, 34, 36, 38. In an advantageous embodiment, the body 30 of the light guide 10 is edge-lit with an LED light source 42. In another embodiment, such as that illustrated schematically in FIG. 3, the LED light source 42 provides direct illumination and is backlit through a lens 62 and/or a diffuser 64. The lens 62 can be a collimating or expanding lens. Other lighting arrangements and adjustments to the illumination pattern are certainly possible.

Microablation sites 46 scatter light emitted from the light source 42 and can form an optical branding or design feature in the light guide 10. The scattered light from the light source 42 creates a glow around each of the microablation sites 46 that is not generally visible in the remainder of the body 30. While prefixes such as "micro" and "nano" are used to describe various features of the light guide 10, such as the microablation sites 46, these prefixes are generally used to describe things that are qualitatively small, not necessarily things that are on a specific quantitative "micro" or "nano" scale. The plurality of microablation sites 46 can be formed by a focused laser beam that engraves through the outer perimeter 52 of the body 30 to subsurface etch the indicia patterns 48, 50, without causing damage to or marking the outer surfaces. Each microablation site 46 includes highly localized microscopic cracks which scatter light from the light source 42. The laser can be programmed to engrave individual microablation sites 46 that are akin to dots formed with a three-dimensional dot-matrix printer. As addressed above, advantageously, the laser beam first strikes a planar outer surface 58, or more particularly, the planar engraving outer side 34, before engraving within the body 30. This can allow for more accurate subsurface etching.

In the embodiments schematically shown in FIGS. 2 and 3, the plurality of microablation sites 46 are configured to appear in a stippled first indicia pattern 48 (FIG. 2) and a stippled second indicia pattern 50 (FIG. 3) at a different viewing angle. In some embodiments (e.g., FIG. 4) and in other subsurface engraved implementations, the plurality of microablation sites 46' appear to show the same pattern despite the viewing angle. In the embodiment of FIGS. 2 and 3, however, the indicia patterns 48, 50 are different. In this particular implementation, the first indicia pattern 48 is a random pattern 66. The random pattern 66 is not an intelligible word, pictogram, etc., but rather, appears to a user or onlooker of the vehicle 12 as an array of dots or points without order. The random pattern 66 may be observed outside of the second viewing angle range 22 that is generally associated with a more direct line of sight. When the observer is in the periphery (e.g., within the first viewing angle range 20), the first indicia pattern 48 or random pattern 66 is observed.

When a user or onlooker of the vehicle 12 views the primary viewing outer side 32 directly (e.g., from somewhere within the range 22), as shown in FIG. 3, the second indicia pattern 50 is viewable. The plurality of microablation sites 46 is the same in both the first indicia pattern 48 and the second indicia pattern 50; however, the microablation sites 46 are particularly dispersed between the primary viewing outer side 32 and the opposite side, which in this embodiment, is the planar engraving outer side 34. Accordingly, the random pattern 66, shown in FIG. 2, appears to align and form a discernable or intelligible pattern 68, which can be a logo or brand 70 of the vehicle 12. In this embodiment, the logo 70 includes legible text 72, whereas the random pattern 66 illustrated in FIG. 2 is illegible. The discernable pattern 68 could also be or include some sort of picture, design, or other indicia marking. In one embodiment, the second indicia pattern 50, along with the first indicia pattern 48, both include a discernable logo or brand that are viewable from different angles. For example, when observing the light guide 10 from one side, the first indicia pattern may appear as one word or pictogram, but when observing the light guide from the other side, the second indicia pattern may appear as a second word or pictogram, where the different words and pictograms may have a complementary significance (e.g., a word and a logo, when viewed from different perspectives, could refer to the make or model of the vehicle 12).

The patterns 48, 50 can be localized to a certain area within the body 30, or more dispersed along the axial length of the body between both the proximal and distal ends 40, 44. To create the multifaceted display features of the light guide 10, where the patterns 48, 50 are different depending on the viewing angle, the plurality of microablation sites 46 are strategically dispersed between the primary viewing outer side 32 and the opposite side 34. Dimensional variation through the depth of the light guide 10 can allow for the microablation sites 46 to appear aligned when looking at the light guide from certain angles (e.g., when looking at directly), but appear random or misaligned when looking at the light guide from other angles (e.g., when looking at from a peripheral view). Instead of being all aligned in a single plane within the body 30, the microablation sites 46 are spread through the volume of the body between the sides 32, 34. In one embodiment, the microablation sites 46 are spread through about 20-85% of the thickness of the body 30 between the sides 32, 34. The greater the dispersal amount, the narrower the range 22 of direct viewing angles. Accordingly, the first indicia pattern 48 appears as a random, three-dimensional array pattern from most of the periphery, and then from a direct or almost direct viewing angle, the second indicia pattern 50 appears as an intelligible, two-dimensional design.

Figure 5:
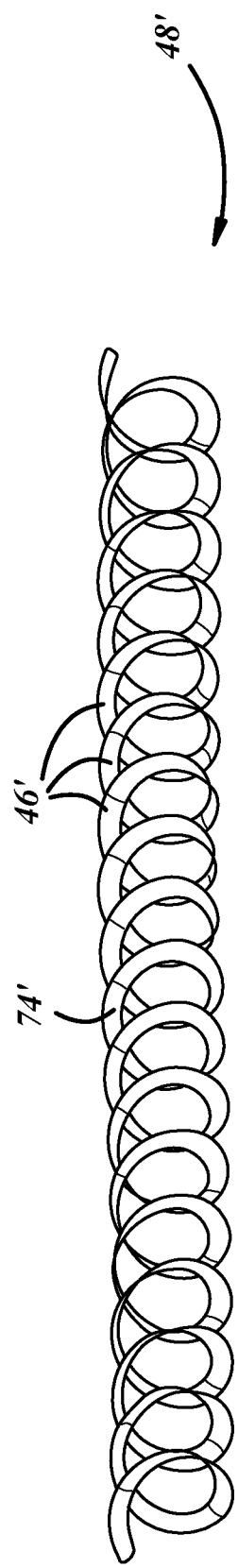
FIG. 5 illustrates the indicia pattern of the light guide of FIG. 4.

Other embodiments, such as the embodiment illustrated in FIG. 4, may not include the varying indicia patterns 48, 50, and may only include one indicia pattern 48' that appears the same despite the viewing angle. FIG. 5 is an enlarged view of the indicia pattern 48' used in the light guide 10 of FIG. 4. In this embodiment, the indicia pattern 48' includes a spiral 74 made from overlapping microablation sites 46'. The microablation sites 46' are overlapping or directly adjacent within the depth of the light guide 10 between the sides 32', 34' to form a continuous shape or design that is discernable from a multitude of various viewing angles (e.g., the spiral 74 looks like a spiral no matter what the viewing orientation or viewing angle). This is different from the embodiment of FIGS. 2 and 3 in which the microablation sites 46 include space or non-ablated material of the body 30 between adjacent sites (in the depth direction). The spiral 74 may be an advantageous design with the mushroom-shaped body 30', as the convex contour 56 can add visual interest and mimic the rounded shape of the spiral. In the illustrated embodiment, shown more particularly in FIG. 5, the spiral 74 has a helical, ribbon-like appearance.

Manufacturing of the light guide 10, in accordance with one embodiment, generally includes engraving a plurality of microablation sites 46 through the planar engraving outer side 58 of the body 30. The body 30 may be an extruded plastic doped with nanoparticles to help concentrate heat during the engraving process. A laser can be directed at the side 34, with the focal length being adjusted to create the microablation sites 46 at the desired location beneath the outer surfaces and within the body (subsurface etching). The plurality of microablation sites 46 can be dispersed such that from a first viewing angle with respect to the primary viewing outer side, the plurality of microablation sites are configured to appear in a first indicia pattern 48, and from a second viewing angle with respect to the primary viewing outer side, the plurality of microablation sites are configured to appear in a second indicia pattern 50. In other embodiments, such as that shown in FIGS. 4 and 5, the indicia pattern 50 may appear the same no matter what the viewing orientation or direction. The light guide 10 can then be packaged with the light source 42 and other components, and then assembled into vehicle 12. An electronic control unit (ECU), such as a body control module (BCM) can be used to facilitate operation of the light source 42.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A light guide for a vehicle, comprising:
a body having a primary viewing outer side; and
a plurality of microablation sites located within the body, wherein from a first viewing angle with respect to the primary viewing outer side, the plurality of microablation sites are configured to appear in a first indicia pattern, and wherein from a second viewing angle with respect to the primary viewing outer side, the plurality of microablation sites are configured to appear in a second indicia pattern.

2. The light guide of claim 1, wherein the light guide is or is part of a dash panel light, a center console light, or a door panel light, and the primary viewing outer side faces toward an interior cabin of the vehicle.

3. The light guide of claim 1, wherein the body is extruded or molded acrylic doped with nanoparticles that are configured to act as heat concentrators.

4. The light guide of claim 1, wherein the first indicia pattern is a random pattern and the second indicia pattern is an intelligible pattern.

5. The light guide of claim 4, wherein the intelligible pattern includes legible text.

6. The light guide of claim 1, wherein both the first indicia pattern and the second indicia pattern are intelligible patterns, and the first indicia pattern is a first word or pictogram and the second indicia pattern is a second word or pictogram.

7. The light guide of claim 1, wherein at least some of the microablation sites of the plurality of microablation sites are spread in a dispersal amount through 20-85%, inclusive, of a thickness of the body between the primary viewing outer side and an opposite planar engraving outer side.

8. The light guide of claim 7, wherein the dispersal amount is correlated with a range of direct viewing angles such that a greater dispersal amount results in a narrower range of direct viewing angles.

9. The light guide of claim 1, wherein the primary viewing outer side has a convex contour.

10. The light guide of claim 9, wherein the body is a mushroom-shaped body having a mushroom-shaped outer perimeter when viewed in cross-section.

11. A light guide for a vehicle, comprising:
a body having a planar engraving outer side and a rounded primary viewing outer side; and
a plurality of microablation sites etched through the planar engraving side and viewable as an indicia pattern through the rounded primary viewing outer side, wherein the indicia pattern is a spiral.

12. The light guide of claim 11, wherein the spiral is formed from overlapping or directly adjacent microablation sites from the plurality of microablation sites.

13. The light guide of claim 11, wherein the rounded primary viewing outer side has a convex contour.

14. The light guide of claim 13, wherein the body is a mushroom-shaped body having a mushroom-shaped outer perimeter when viewed in cross-section.

15. The light guide of claim 14, wherein the body includes a plurality of planar engraving outer sides.

16. The light guide of claim 11, wherein the plurality of microablation sites are configured to appear as the indicia pattern from a first viewing angle with respect to the rounded primary viewing outer side, and wherein the plurality of microablation sites are configured to appear as a second indicia pattern from a second viewing angle with respect to the rounded primary viewing outer side.

17. A method of manufacturing a light guide for a vehicle, the light guide comprising: a body having a planar engraving outer side and a primary viewing outer side, the method comprising the steps of:
engraving a plurality of microablation sites through the planar engraving outer side of the body; and
dispersing the plurality of microablation sites such that, from a first viewing angle with respect to the primary viewing outer side, the plurality of microablation sites are configured to appear in a first indicia pattern, and from a second viewing angle with respect to the primary viewing outer side, the plurality of microablation sites are configured to appear in a second indicia pattern.

18. The method of claim 17, wherein at least some of the microablation sites of the plurality of microablation sites are spread in a dispersal amount through 20-85%, inclusive, of a thickness of the body between the primary viewing outer side and an opposite planar engraving outer side.

19. The method of claim 17, wherein the primary viewing outer side has a convex contour and the body has a plurality of planar engraving outer sides, and wherein the engraving step engraves a plurality of microablation sites through more than one of the planar engraving outer sides.

* * * * *